US012676359B2

(12) United States Patent
Soejima

(10) Patent No.: US 12,676,359 B2
(45) Date of Patent: Jul. 7, 2026

(54) POWER STORAGE DEVICE

(71) Applicant: TOYOTA JIDOSHA KABUSHIKI KAISHA, Toyota (JP)

(72) Inventor: Takanori Soejima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 545 days.

(21) Appl. No.: 18/204,478

(22) Filed: Jun. 1, 2023

(65) Prior Publication Data

US 2024/0055691 A1 Feb. 15, 2024

(30) Foreign Application Priority Data

Aug. 9, 2022 (JP) ................................. 2022-127054

(51) Int. Cl.
*H01M 10/00* (2006.01)
*H01M 10/613* (2014.01)
*H01M 10/625* (2014.01)
*H01M 10/653* (2014.01)
*H01M 10/6555* (2014.01)

(52) U.S. Cl.
CPC ....... *H01M 10/653* (2015.04); *H01M 10/613* (2015.04); *H01M 10/625* (2015.04); *H01M 10/6555* (2015.04); *H01M 2220/20* (2013.01)

(58) Field of Classification Search
CPC ............. H01M 10/653; H01M 10/655; H01M 10/6554; H01M 10/6555; H01M 10/613; H01M 10/647
See application file for complete search history.

(56) References Cited

FOREIGN PATENT DOCUMENTS

| | | | |
|---|---|---|---|
| JP | 2018-022694 A | | 2/2018 |
| JP | 2020-021532 A | | 2/2020 |
| JP | 2021118057 A | * | 8/2021 |

* cited by examiner

*Primary Examiner* — Tiffany Legette
*Assistant Examiner* — Douglas C Marronquin
(74) *Attorney, Agent, or Firm* — Dinsmore & Shohl LLP

(57) ABSTRACT

The power storage device includes a plurality of storage battery units stacked in a predetermined direction, and a heat dissipating material for dissipating heat generated in the storage battery unit. The plurality of storage battery units includes a storage battery unit and a storage battery unit disposed at a position adjacent to the storage battery unit along a predetermined direction. The heat dissipating material includes a first flat plate portion disposed between the storage battery unit and the storage battery unit, and a second flat plate portion that transmits heat between the storage battery unit and a storage battery unit different from the storage battery unit and the storage battery unit.

2 Claims, 2 Drawing Sheets

POWER STORAGE DEVICE

CROSS-REFERENCE TO RELATED APPLICATION

This application claims priority to Japanese Patent Application No. 2022-127054 filed on Aug. 9, 2022, incorporated herein by reference in its entirety.

BACKGROUND

1. Technical Field

The present disclosure relates to a power storage device.

2. Description of Related Art

For example, a power storage device mounted on an electrified vehicle or the like includes a plurality of storage battery units in which storage batteries are packaged. In the power storage device, the storage battery units are electrically connected in series and are stacked and arranged in a predetermined direction.

When charging and discharging from the power storage device are performed, heat is generated in each of the storage battery units. Therefore, as described in Japanese Unexamined Patent Application Publication No. 2020-21532 (JP 2020-21532 A), the power storage device is often provided with a heat dissipating plate for suppressing a temperature rise of the storage battery units. The heat dissipating plate is a plate-shaped member interposed between the storage battery units adjacent to each other, and discharges heat from the storage battery units to the outside.

SUMMARY

For example, when the temperature is locally increased in one of the storage battery units due to deterioration of the storage battery or the like, a so-called "thermal chain" or "thermal runaway" phenomenon in which the amount of heat generation is further increased due to an increase in temperature may occur in that storage battery unit. It is preferable to suppress temperature variations of the storage battery units as much as possible so as to suppress thermal runaway.

An object of the present disclosure is to provide a power storage device capable of suppressing temperature variations of storage battery units.

A power storage device according to the present disclosure includes: a plurality of storage battery units stacked in a predetermined direction; and a heat dissipating material for dissipating heat generated in the storage battery units. The storage battery units includes a first storage battery unit, and a second storage battery unit disposed at a position adjacent to the first storage battery unit along the predetermined direction. The heat dissipating material includes a first portion disposed between the first storage battery unit and the second storage battery unit, and a second portion that transmits heat between the first storage battery unit and another one of the storage battery units than the second storage battery unit.

In the power storage device having such a configuration, the heat generated in the first storage battery unit is not only transmitted to the second storage battery unit via the first portion of the heat dissipating material, but also transmitted to another storage battery unit (a storage battery unit different from the first storage battery unit and the second storage battery unit) via the second portion. Since heat is transferred to a wider range than in the related art, a local temperature rise in some storage battery units is suppressed. As a result, temperature variation of the storage battery units can be suppressed.

According to the present disclosure, the power storage device capable of suppressing temperature variations of the storage battery units is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
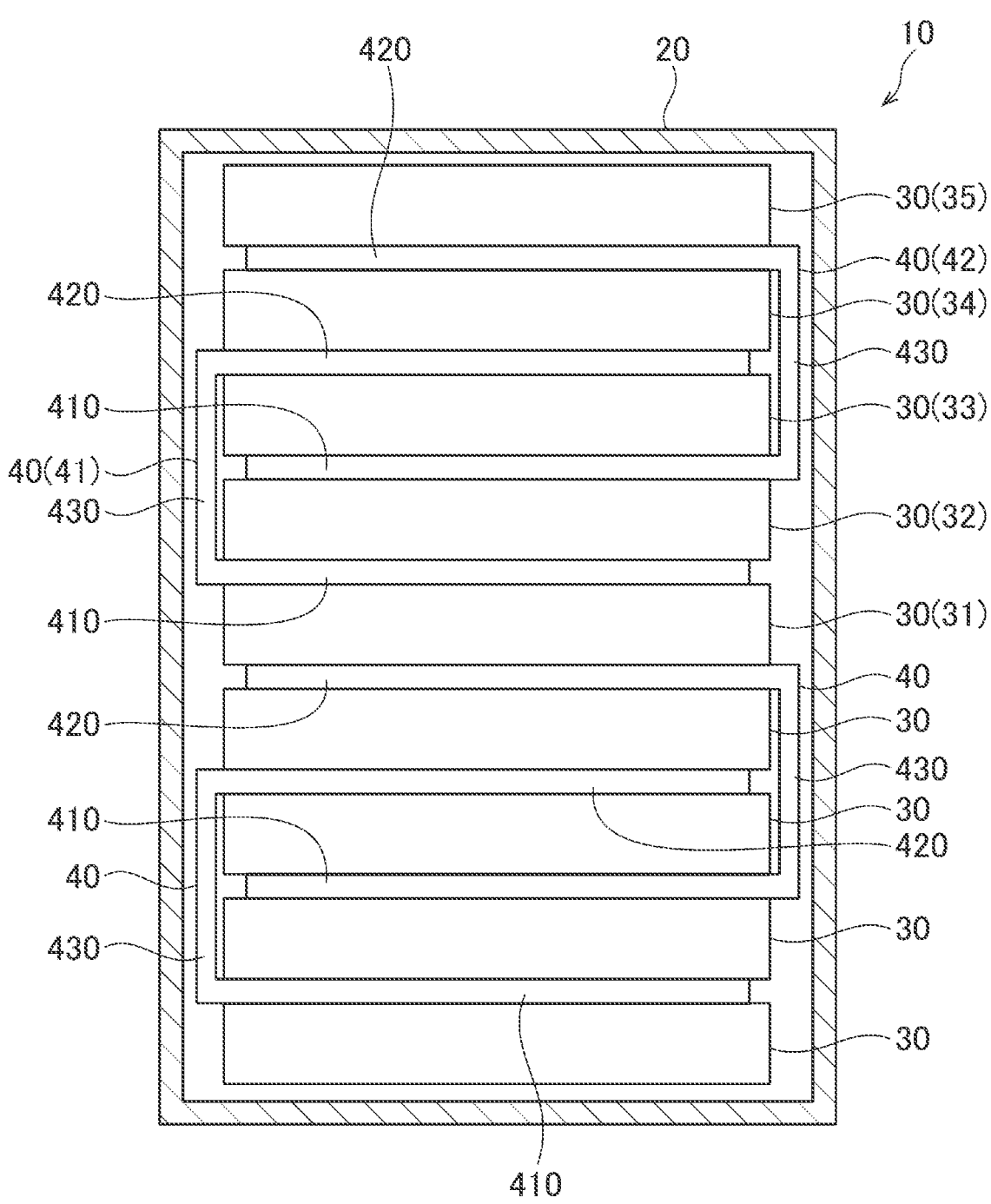
FIG. 1 is a diagram schematically illustrating a configuration of a power storage device according to the present embodiment.

Hereinafter, the present embodiment will be described with reference to the accompanying drawings. In order to facilitate understanding of the description, the same components are denoted by the same reference numerals as much as possible in the drawings, and redundant description will be omitted.

The configuration of the power storage device 10 according to the present embodiment will be described with reference to FIG. 1. The power storage device 10 is mounted on an electrified vehicle (not shown) and is a device for storing electric power required for electrified vehicle to travel. The power storage device 10 stores electric power supplied from an external charging device. The electric power outputted from the power storage device 10 is supplied to a rotary electric machine included in electrified vehicle, and generates a driving force for traveling in the rotary electric machine. The power storage device 10 may store regenerative electric power generated in the rotary electric machine.

As illustrated in FIG. 1, the power storage device 10 includes a case 20, a storage battery unit 30, and a heat dissipating material 40. In FIG. 1, the configuration of the power storage device 10 is schematically illustrated, and the dimensional ratios and the like of the respective parts are different from those of the actual ones. The same applies to the FIGS. 2A and 2B used in the subsequent explanation.

The case 20 is a container for accommodating the storage battery unit 30 and the heat dissipating material 40, which will be described later, inside. The case 20 is made of an insulating material such as resin. The resin may be, for example, polypropylene or a resin obtained by dispersing glass in polypropylene. In FIG. 1, in order to show the internal configuration of the case 20, a state in which only the case 20 is cut along a horizontal plane is depicted in a top view. The shape of the case 20 in a top view is substantially rectangular.

The storage battery unit 30 is a package of a storage battery (not shown), such as a lithium ion battery, for example, and a plurality of storage batteries are provided in the power storage device 10. Although nine storage battery units 30 are illustrated in FIG. 1, the number of storage battery units 30 may be different from this. Each of the storage battery units 30 has a substantially rectangular parallelepiped shape. The plurality of storage battery units 30 are stacked so as to be aligned along the longitudinal direction (vertical direction in FIG. 1) of the case 20 in a state in which the widest surfaces thereof face each other. The direction is also referred to hereinafter as the "stacking direction".

Each of the storage battery units 30 has a pair of electrode terminals including a positive electrode and a negative electrode. In FIG. 1, the illustration is omitted. By connecting the electrode terminals of the adjacent storage battery units 30, all the storage battery units 30 provided in the power storage device 10 are electrically connected in series. The direction in which the electrode terminals protrude from the storage battery unit 30 may be the left-right direction in FIG. 1. The direction in which the electrode terminals protrude from the storage battery unit 30 may be a direction toward the front side of the paper (that is, a direction toward the upper side of the vehicle).

The heat dissipating material 40 is a member for discharging the heat generated in the storage battery unit 30 to the outside, and is provided in the power storage device 10. In the present embodiment, the heat dissipating material 40 is a plate-shaped member made of aluminum. A portion (e.g., the lowermost portion) of the heat dissipating material 40 is thermally connected to the chassis of the vehicle. Accordingly, heat from the storage battery unit 30 can be released to the chassis.

The heat dissipating material 40 is bent at two positions as shown in FIG. 1. The heat dissipating material 40 is partitioned into three portions including a first flat plate portion 410, a second flat plate portion 420, and a connecting portion 430 by respective folds.

The first flat plate portion 410 and the second flat plate portion 420 are portions whose normal direction is along the stacking direction, and face each other in a state where the two storage battery units 30 are sandwiched therebetween. Each of the first flat plate portion 410 and the second flat plate portion 420 is sandwiched between a pair of storage battery units 30 adjacent to each other. The first flat plate portion 410 and the second flat plate portion function as a portion that receives heat generated in the adjacent storage battery unit 30. In addition, the first flat plate portion 410 and the second flat plate portion may function as a portion that transmits heat transmitted through the connecting portion 430 to the adjacent storage battery unit 30. The first flat plate portion 410 and the second flat plate portion 420 may be in direct contact with the storage battery unit 30, but may be in contact with the storage battery unit 30 via a heat transfer member (not shown).

The connecting portion 430 is a portion connecting between the first flat plate portion 410 and the second flat plate portion 420, that is, a portion between two folds formed in the heat dissipating material 40. The connecting portion 430 has a normal line direction along the left-right direction in FIG. 1. As shown in FIG. 1, the plurality of heat dissipating materials 40 includes a connecting portion 430 disposed on the right side of FIG. 1 and a connecting portion 430 disposed on the left side of FIG. 1. These are arranged alternately along the stacking direction.

For convenience of explanation, the storage battery unit 30 labeled "31" in FIG. 1 is also referred to as "storage battery unit 31" hereinafter. Similarly, the storage battery units 30 labeled "32", "33", "34", and "35" in FIG. 1 are also referred to below as "storage battery unit 32", "storage battery unit 33", "storage battery unit 34", and "storage battery unit 35", respectively.

Similarly, the heat dissipating material 40 labeled "41" in FIG. 1 is also referred to as "heat dissipating material 41" hereinafter. Similarly, the heat dissipating material 40 labeled "42" in FIG. 1 is also referred to as "heat dissipating material 42" hereinafter.

When attention is paid to the heat dissipating material 41, the first flat plate portion 410 of the heat dissipating material 41 is disposed between the storage battery unit 31 and the storage battery unit 32 adjacent to each other, and can exchange heat with the storage battery units 31 and 32. The storage battery units 31 and 32 correspond to the "first storage battery unit" and the "second storage battery unit" of the present embodiment, respectively. The first flat plate portion 410 sandwiched therebetween corresponds to the "first portion" of the heat dissipating material 41.

The second flat plate portion 420 of the heat dissipating material 41 is disposed between the storage battery unit 33 and the storage battery unit 34 adjacent to each other, and is capable of exchanging heat with the storage battery units 33 and 34. The storage battery units 33 and 34 correspond to the "third storage battery unit" and the "fourth storage battery unit" of the present embodiment, respectively. The second flat plate portion 420 sandwiched therebetween corresponds to the "second portion" of the heat dissipating material 41.

As described above, when the four storage battery units 30 arranged continuously along the stacking direction are the "first storage battery unit", the "second storage battery unit", the "third storage battery unit", and the "fourth storage battery unit" in order from one side, the heat dissipating material 41 has a first portion (first flat plate portion 410) disposed between the first storage battery unit and the second storage battery unit, and a second portion (second flat plate portion 420) disposed between the third storage battery unit and the fourth storage battery unit. As is apparent from FIG. 1, the same applies to the heat dissipating material 40 other than the heat dissipating material 41.

Further, when the storage battery unit 35 is referred to as a "fifth storage battery unit", the plurality of heat dissipating materials 40 included in the power storage device 10 includes both a heat dissipating material 41 (first heat dissipating material) in which a part is disposed between the first storage battery unit and the second storage battery unit and the other part is disposed between the third storage battery unit and the fourth storage battery unit, and a heat dissipating material 42 (second heat dissipating material) in which a part is disposed between the second storage battery unit and the third storage battery unit and the other part is disposed between the fourth storage battery unit and the fifth storage battery unit.

In order to clarify the benefits of such a configuration, the transfer of heat through the heat dissipating material 40 will be described referring to FIGS. 2A and 2B. As is well known, when, for example, deterioration of the storage battery occurs inside the storage battery unit 30, the amount of heat generated in the storage battery unit 30 increases, and the temperature may increase locally. Hereinafter, an example in which a local increase in the amount of heat generation occurs in the storage battery unit 33 among the plurality of storage battery units 30 will be described.

Figure 2A:
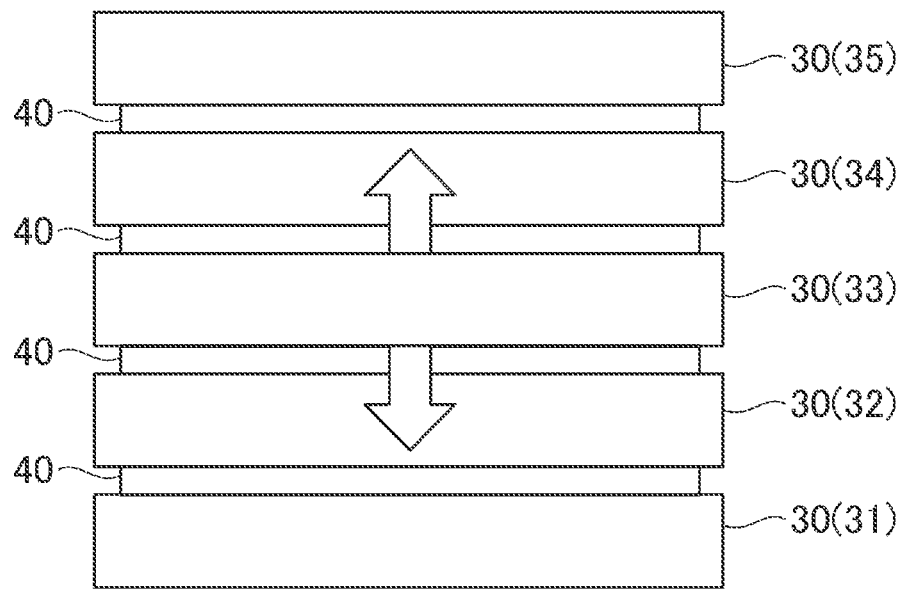
FIG. 2A is a diagram for explaining an example of heat transfer occurring in a storage battery unit.

FIG. 2A illustrates a total of five storage battery units 30 centered on the storage battery unit 33 in the power storage device 10 according to the comparative embodiment. In this comparative example, each of the heat dissipating materials 40 is a simple flat plate, and is arranged between the storage battery units 30 adjacent to each other.

In such a configuration, when the amount of heat generated in the storage battery unit 33 increases, a large amount of heat from the storage battery unit 33 is transmitted to the adjacent storage battery units 32 and 34 via the heat dissipating material 40. On the other hand, less heat is transferred to the adjacent storage battery units 31 and 35. Therefore, of the plurality of storage battery units 30 provided in the power storage device 10, only three of the storage battery units 32, 33, and 34 have a higher temperature than the other storage battery units 30. Since the temperature variation between the storage battery units 30 is relatively large, so-called "thermal runaway" may occur.

Figure 2B:
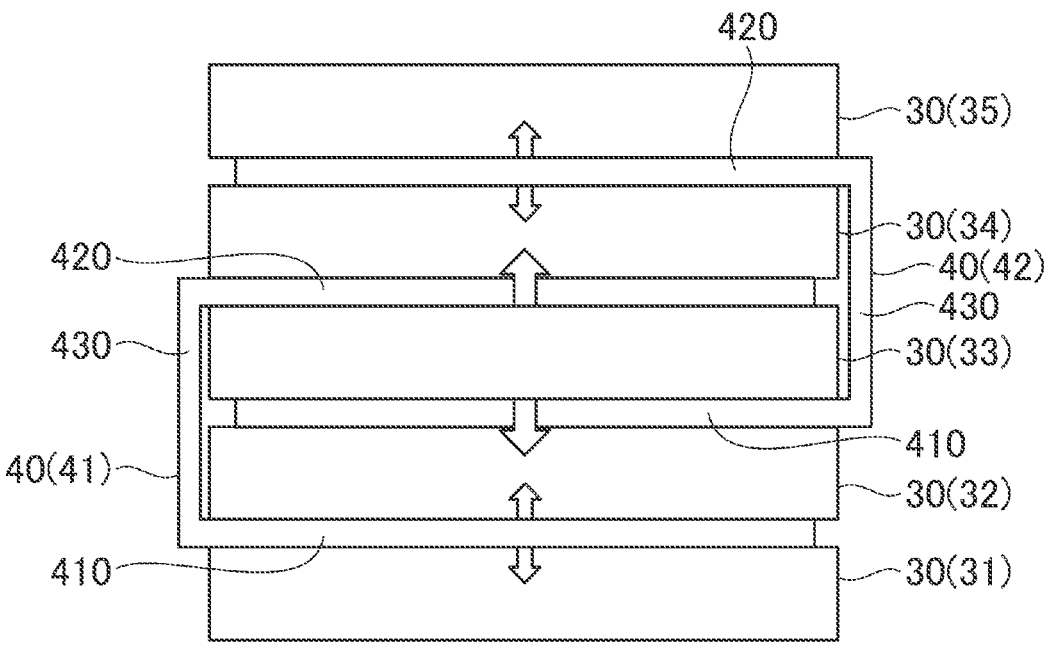
FIG. 2B is a diagram for explaining another embodiment of heat transfer occurring in the storage battery unit.

In FIG. 2B of the drawings, the configuration of the power storage device 10 according to the present embodiment is depicted in the same manner as in FIG. 2A. In the configuration of the present embodiment, when the amount of heat generated in the storage battery unit 33 increases, a part of the heat generated in the storage battery unit 33 is transmitted to the adjacent storage battery unit 34 via the second flat plate portion 420 of the heat dissipating material 41, and is transmitted to the adjacent storage battery unit 32 via the first flat plate portion 410 of the heat dissipating material 42. Further, another part of the heat from the storage battery unit 33 is transmitted to the storage battery units 31 and 32 via the connecting portion 430 and the first flat plate portion 410 of the heat dissipating material 41, and is transmitted to the storage battery units 34 and 35 via the connecting portion 430 and the second flat plate portion 420 of the heat dissipating material 42.

That is, in the configuration of the present embodiment, the heat from the storage battery unit 33 is transmitted to a total of four storage battery units 30 including the storage battery units 31, 32, 33, and 34, and the temperature of the total of five storage battery units 30 including the storage battery unit 33 is increased substantially uniformly. Therefore, as compared with the configuration of the comparative example as shown in FIG. 2A, the variation in the temperature between the storage battery units 30 is suppressed, so that the likelihood of thermal runaway can be reduced.

According to experiments conducted by the present inventors, it was confirmed that the temperature of the storage battery unit 30 increased to 200° C. at the highest point in the configuration of the comparative example can be reduced to 150° C. or less at the highest point by employing the configuration of the present embodiment.

Note that, of the respective heat dissipating materials 40, a portion that transmits heat to and from the storage battery unit 30, that is, a shape of the first flat plate portion 410 and the second flat plate portion 420 may be a shape other than a plate shape. For example, a portion corresponding to the first flat plate portion 410 or the like may have a plurality of rod shapes or a mesh shape. However, from the viewpoint of efficiently transferring heat to and from the storage battery unit 30 in a state of being disposed between the stacked storage battery units 30, it is desirable to form a plate shape as in the present embodiment.

The second portion (for example, the second flat plate portion 420) of the heat dissipating material 40 is not disposed between the adjacent storage battery units 30, and may be configured to transmit heat to, for example, a side surface of the storage battery unit 30. In other words, the second portion of the heat dissipating material 40 may be any material that transmits heat to and from the storage battery units 30 different from the storage battery units 31 and 32 that exchange heat with the first portion.

In the present embodiment, four storage battery units 31 and 32 that exchange heat with the first flat plate portion 410 of the heat dissipating material 41 and four storage battery units 33 and 34 that exchange heat with the second flat plate portion 420 of the heat dissipating material 41 are arranged sequentially in the stacking direction. Instead of such a configuration, another storage battery unit 30 may be interposed between the storage battery unit 32 and the storage battery unit 33. That is, three or more storage battery units 30 may be sandwiched between the first flat plate portion 410 and the second flat plate portion 420 of the heat dissipating material 41.

In the present embodiment, the heat dissipating material 41 as the first heat dissipating material and the heat dissipating material 42 as the second heat dissipating material are provided as separate members separated from each other. Instead of such a configuration, the heat dissipating material 41 and the heat dissipating material 42 may be provided as an integral member connected to each other.

The present embodiment has been described above with reference to specific examples. However, the present disclosure is not limited to these specific examples. Those skilled in the art with appropriate design modifications to these specific examples are also included in the scope of the present disclosure as long as they include the features of the present disclosure. Each element included in each of the above-described specific examples and the arrangement, condition, shape, and the like thereof are not limited to those illustrated, and can be appropriately changed. Each element included in each of the above-described specific examples can be appropriately combined and changed as long as there is no technical inconsistency.

What is claimed is:

1. A power storage device comprising: a plurality of storage battery units stacked in a predetermined direction; and a plurality of heat dissipating materials for dissipating heat generated in the storage battery units, wherein: the plurality of storage battery units include: a first storage battery unit, a second storage battery unit disposed at a position adjacent to the first storage battery unit along a predetermined direction, a third storage battery unit disposed at a position adjacent to the second storage battery unit along the predetermined direction, a fourth storage battery unit disposed at a position adjacent to the third storage battery unit along the predetermined direction, and a fifth storage battery unit disposed at a position adjacent to the fourth storage battery unit along the predetermined direction; the heat dissipating material includes: a first heat dissipating material having a first portion disposed between and abutting both the first storage battery unit and the second storage battery unit, a second portion disposed between and abutting both the third storage battery unit and the fourth storage battery unit, and a first connecting portion extending form the first portion to the second portion, and a second heat dissipating material separate from the first heat dissipating material and having a third portion between and abutting both the second storage battery unit and the third storage battery unit, a fourth portion disposed between and abutting both the fourth storage battery unit and the fifth storage battery unit, and a second connecting portion extending from the third portion to the fourth portion; the first storage battery unit, the second storage battery unit, the third storage battery unit, the fourth storage battery unit, and the fifth storage battery unit are stacked so as to be aligned along the predetermined direction in a state in which a widest surface of the first storage battery unit, the second storage battery unit, the third storage battery unit, the fourth storage battery unit, and the fifth storage battery unit face each other and, wherein the first storage battery unit, the second storage battery unit, the third storage battery unit, the fourth storage battery unit, and the fifth storage battery unit each include only one positive electrode and only one negative electrode.

2. The power storage device of claim 1, wherein each of the first portion, the second portion, the third portion, and the fourth portion is a flat plate.

* * * * *